Dec. 9, 1952 R. H. STEARNS 2,620,901
SELF-APPLYING ELECTROMAGNETICALLY RELEASABLE BRAKE
Filed Jan. 19, 1949 3 Sheets-Sheet 1

Inventor
ROSWELL H. STEARNS
By
Wheeler, Wheeler & Wheeler
Attorneys

Dec. 9, 1952 R. H. STEARNS 2,620,901
SELF-APPLYING ELECTROMAGNETICALLY RELEASABLE BRAKE
Filed Jan. 19, 1949 3 Sheets-Sheet 2
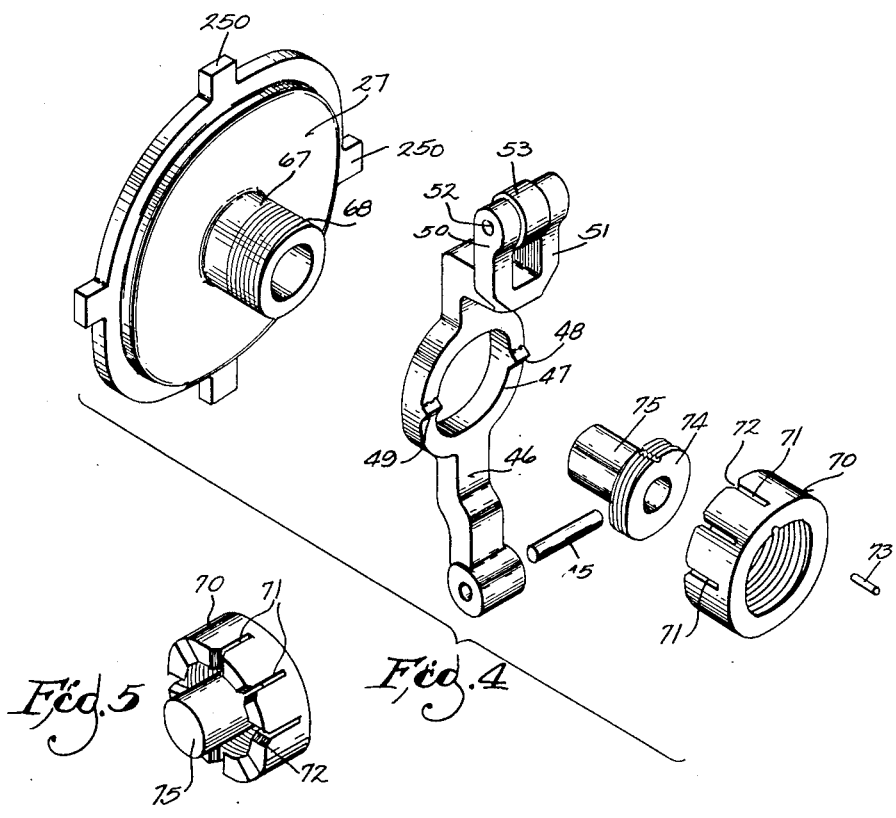
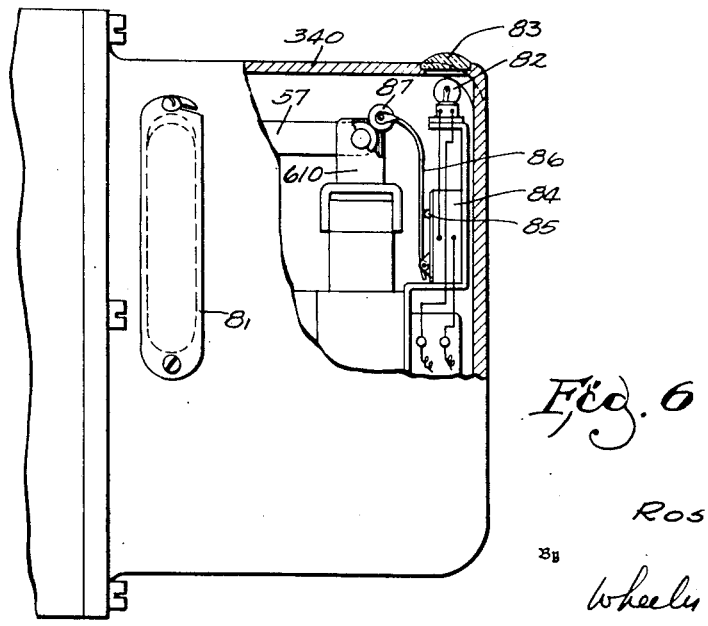
Inventor
ROSWELL H. STEARNS
By
Wheeler, Wheeler & Wheeler
Attorneys

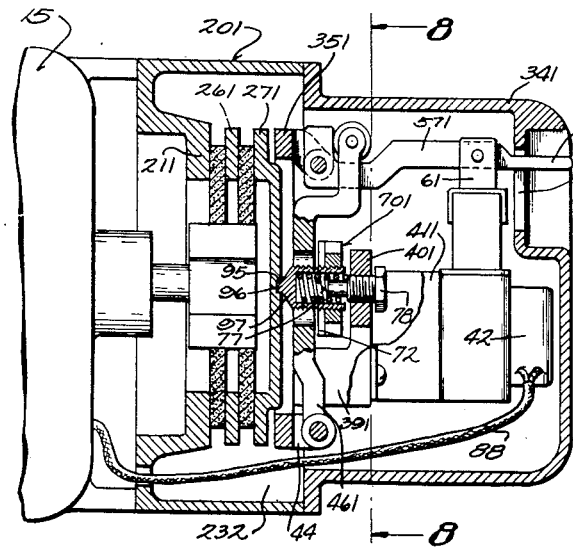
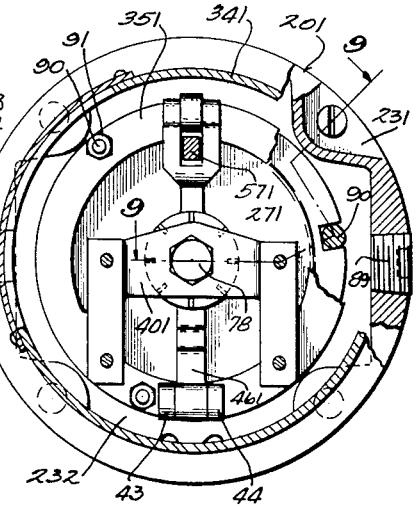
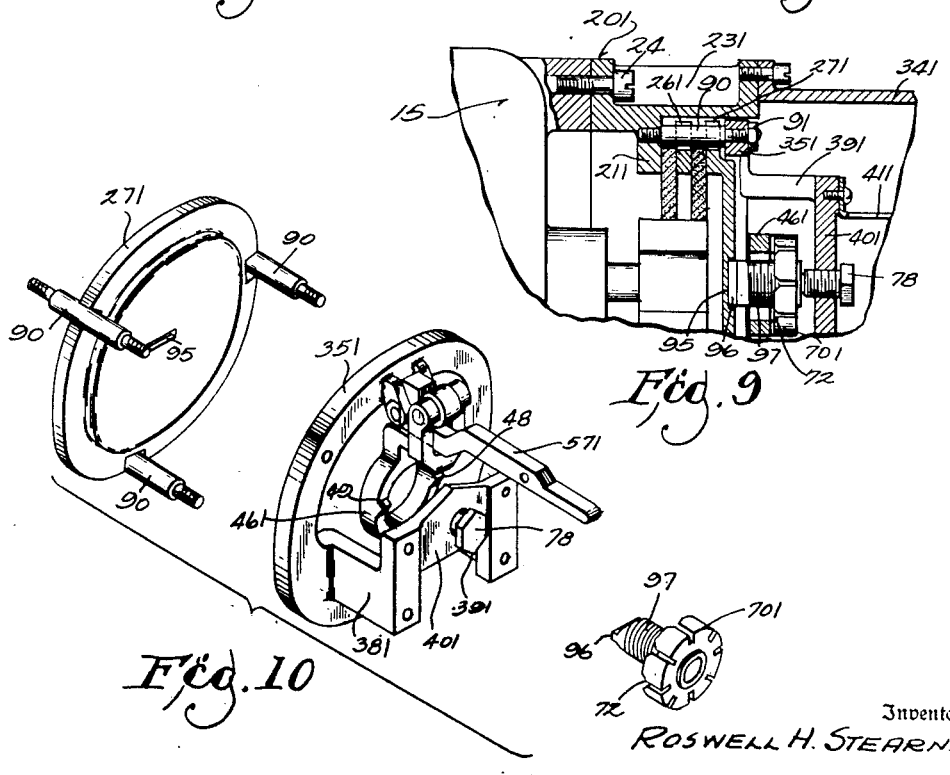

Patented Dec. 9, 1952

2,620,901

UNITED STATES PATENT OFFICE 2,620,901

SELF-APPLYING ELECTROMAGNETICALLY RELEASABLE BRAKE

Roswell H. Stearns, Milwaukee, Wis., assignor of one-half to Roswell N. Stearns, Milwaukee, Wis.

Application January 19, 1949, Serial No. 71,704

18 Claims. (Cl. 188—171)

This invention relates to self-applying electromagnetically releasable brakes which are applicable to any shaft but are particularly useful as applied to the armature shaft of an electric motor, the brake controlling mechanism being connected either in series or parallel with the motor to release the brake whenever the motor is energized and to apply the brake whenever the motor is deenergized.

It is a primary object of the present invention to provide a new and more compact brake operating and adjusting mechanism, and one which is balanced to equalize wear on all surfaces of the brake disks.

It is a further object of the invention to provide a novel arrangement whereby electrical connections to and from the brake mechanism can be housed. It is a further purpose to provide novel and improved means whereby the status of the brake disks, so far as adjustment and wear are concerned, may be indicated either mechanically or electrically in a manner which leaves the parts fully enclosed against water damage.

In one of the embodiments of the invention, it is a further object to provide a construction in which the brake may be adjusted to compensate for wear without varying the pressure of the brake applying spring.

It is a further object of the invention to provide means whereby all, or substantially all, of the electromagnetically responsive and brake operating and adjusting parts are carried from the motor shell or equivalent mounting independently of the casing whereby such parts are enclosed. Thus, a minimum of work is required to remove the casing and, upon removal thereof, all of the brake operating and adjusting parts are fully exposed in operative position.

Still other objects of the invention will appear more particularly from the following disclosure thereof.

In the drawings:

Fig. 4 is a detail view in perspective showing in mutually separated positions some of the component parts in the brake operating and adjusting mechanism.

Fig. 5 is a view in perspective showing the special adjusting nut which is a feature of the present invention.

Fig. 6 is a view partially in side elevation and partially broken away to an axial section to show a modified signalling arrangement for indicating the need of adjustment.

Fig. 7 is a view similar to Fig. 1 on a somewhat reduced scale showing in axial section a further modified embodiment of the invention.

Fig. 8 is a view taken on the line 8—8 of Fig. 7.

Fig. 9 is a detail view taken on the line 9—9 of Fig. 8.

Fig. 10 is a view in perspective showing relatively separated parts used in the assembly of Fig. 7.

Figures 1, 2, 3:
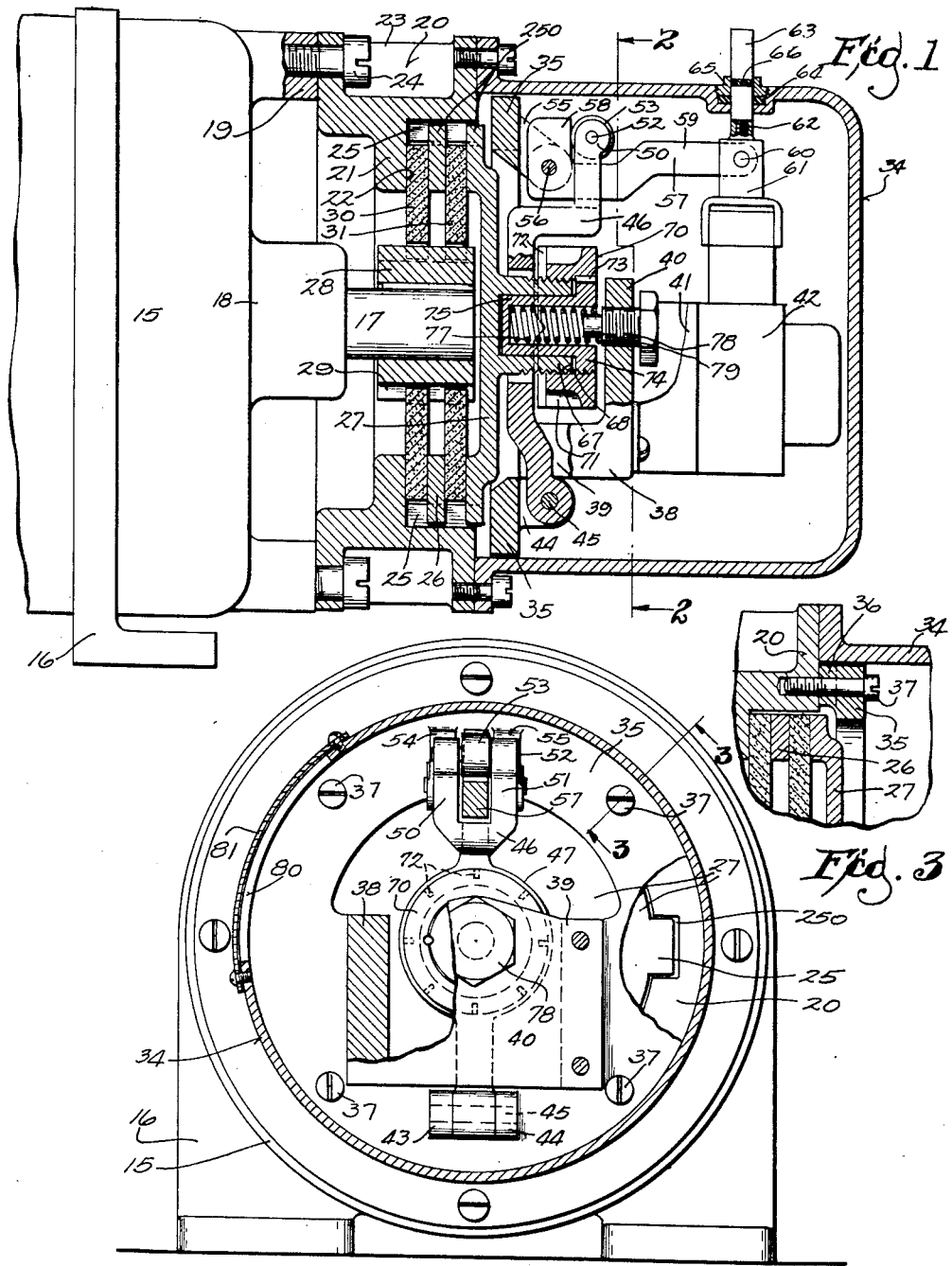
Fig. 1 is a view in axial section through a device embodying the invention, the device being shown applied to the armature shaft of an electric motor, which is shown largely in side elevation.
Fig. 2 is a view taken in section on the line 2—2 of Fig. 1.
Fig. 3 is a view taken in section on the line 3—3 of Fig. 2.

While the invention is by no means limited to use in connection with motor shafts, it is of particular importance in this field. Hence, by way of exemplification, I have shown at 15 the shell of an electric motor having a supporting foot at 16 and an armature shaft at 17. Surrounding the bearing boss 18 of the motor is a ring 19 to which there is screwed the annular adapter 20. There may be included as an integral part of the adapter 20 an inwardly projecting annular flange at 21 which provides at 22 a fixed brake surface. At intervals around the periphery of the adapter, there may be pockets 23 to receive the mounting screws 24. Extending outwardly toward the pockets are axially extending channels 25 engaged by lugs 250 on the peripheries of the floating brake plates 26 and 27, whereby these plates are precluded from rotation.

The armature shaft 17 has in splined connection with it a hub 28 having key ways at 29 (or other equivalent means) for splining thereto the floating rotatable brake disks 30, 31. Brake disk 30 is interposed between the brake surface 22 and the floating stationary disk 26. Rotatable disk 31 is interposed between the floating stationary disk 26 and the pressure plate 27. The parts 21, 26 and 27 are desirably made of metal but the rotatable disks 30 and 31 are desirably made of a brake lining or clutch disk composition of any suitable sort.

Connected with the annulus 20 is a housing 34 for the brake adjusting and actuating mechanism. Such mechanism is mounted on the annulus 20 independently of the housing by means of the mounting ring 35 which is provided with bosses 36 engaging annulus 20 and held thereto by screws 37 at points intermediate the channels 25. Rearwardly extending bracket arms 38 and 39 carry a plate 40 from which the yoke 41 supports the solenoid 42 (Fig. 1). The mounting ring 35 is also provided below the bracket arms 38 and 39 with ears 43, 44 for the pintle 45 upon which is mounted the lower end of the clutch disengaging lever 46. As best shown in Fig. 4, the center of this lever comprises a ring at 47 to clear the adjusting mechanism and to provide fulcrum wedges at 48 and 49. The upper end of the lever comprises laterally spaced arms 50 and 51 supporting a rod 52 upon which the roller 53 is journaled.

The mounting ring 35 further includes ears 54 and 55 carrying a pintle 56 upon which the actuating lever 57 is pivoted. This lever comprises a bell crank having an arm 58 engaged with roller 53 and extending upwardly from pintle 56 to such engagement. The longer arm 59 of the bell crank lever 57 is connected by a pin 60 with the armature 61 of the solenoid 42. There is a threaded stud 62 projecting upwardly from armature 61 to which the push button 63 is detachably screwed. This push button extends through packing 64 and packing nut 65 in the casing or shell 34 for two purposes. First, it permits manual operation of the solenoid, and, secondly, it desirably carries a colored band 66 which, when it emerges from the packing gland 65, indicates that the brake needs adjustment. The packing prevents water from finding access around the push button into the casing 34. The push button is readily unscrewed when it is desired to remove the casing 34. This is the only part of the operating mechanism which extends through the casing and, as will readily be apparent, its removal still leaves the mechanism completely operative when the casing is removed.

When the solenoid 42 is energized to draw its armature 61 downwardly, the motion is communicated through lever 57 and arm 58 thereof to the roller 53, thereby oscillating lever 46 clockwise upon its pintle 45. This motion is communicated to the operating plate 27 of the brake to release the brake in the following manner.

The operating plate 27 of the brake has a rearwardly projecting tubular hub 67 provided with screw threads at 68. This hub projects through the opening in the ringlike central portion 47 of lever 46. Upon it is threaded the adjusting nut 70 which is best shown in Figs. 4 and 5. This nut is provided with a series of radial slots at 71 opening to its periphery to receive a screw driver which may be used as a lever to rotate the nut through a limited angular movement. The slots 71 also open to the end of the nut, where the nut is beveled at 72 to receive the fulcrum wedges 48 and 49 carried by lever 46. The engagement of the wedges in the channeled or beveled grooves 72 formed in the face of the nut impositively holds the nut in any given position of adjustment.

Connected with the nut by means of a key 73 (Fig. 1 and Fig. 4) is the flange 74 of a socketed spring-confining member 75. This member telescopes into the tubular boss 67 of the operating plate 27 of the brake. Within it is a compression spring 77 sufficiently powerful to engage the brake and to hold the solenoid armature in its normally elevated position as shown in Fig. 1. The compression of spring 77 is adjusted by means of the screw 78 which has a reduced end portion at 79 to position the spring and to provide a shoulder against which the spring seats. The adjusting screw 78 is threaded into plate 40. An access opening 80 is provided in the casing 34 and is normally closed by a gasketed cover plate 81 which is removable. When the plate 81 and its gasket are removed, a screw driver may be inserted through the opening 80 into one of the slots 71 of the adjusting nut 70 to rotate the nut. The effect of nut rotation will be to move the brake operating plate 27 relatively to the brake actuating lever 46. In this construction, the adjustment to compensate for wear of the brake disks 30 and 31 will be achieved without any substantial variation of the bias of the compression spring 77, such bias being independently adjustable by means of screw 78.

As the brake disks 30 and 31 wear, the compression spring 77 will cause the follower plate 27 to move farther and farther into the annulus 20, thus raising the armature 61 of solenoid 42 farther and farther in the position taken by the parts when the brake is applied and the solenoid deenergized. Ultimately, the band 66, usually colored red, will become visible and this serves as an indication that readjustment is necessary. The nut 70 will thereupon be adjusted in a direction to unscrew it on the threaded tubular boss 67, thus allowing the follower plate 27 to take a new position with respect to lever 46, while leaving nut 70 and the spring confining tube 75 substantially in their original position respecting the fixed plate 40 (or restoring them to their original position). In this construction, or in that hereinafter to be described, if it be desired to obtain this indication of brake wear without providing any opening in the housing, it is easy to do so visually through the means disclosed in Fig. 6, where the push button 63 has been dispensed with and the solenoid armature 610 has the tapped stud omitted. A pilot light 82 is provided which illuminates the "jewel" or window 83, the latter being hermetically fixed in the casing 340. The pilot light is controlled by a switch 84, the push button 85 of which is operated by an actuating lever 86 which carries a cam follower roller 87 acted on by the end of the bell crank lever 57. As long as the parts are in normal operating position, the lever 57 will not move far enough to operate the push button 85 of switch 84. However, when the wear on the disks of the brake has proceeded to a degree such that readjustment is desirable, the elevated position of the armature 610 and lever 57 will be such that the pilot light will be energized.

In the construction shown in Figs. 7 to 10, inclusive, the mounting annulus 201 has the peculiar form best shown in Figs. 7 and 9, there being externally opening cavities 231 to receive the mounting screws 24 and intervening inwardly opening cavities 232 which serve to conduct the wiring connections 88 between the motor 15 and the solenoid 42. Where connections to an external switch are desired, the annulus 201 may be provided with plugs at 89 to receive electrical conduit connections.

These changes are, of course, alternatively usable in a construction otherwise corresponding with that of Fig. 1.

Another feature which may individually be incorporated in the device of Fig. 1 consists in an arrangement whereby the mounting ring 35 is carried on a set of swiveled posts 90 which, at their inner ends, are screwed into the flange 211, and, at their outer ends, are threaded to receive the nuts 91 which hold the ring 351. This arrangement further reduces the overall dimensions of the brake, since it locates the mounting ring 351 well within the annulus 201. The floating non-rotatable disks 261 and 271, the latter comprising the follower plate of the brake, are peripherally notched to engage the posts 90 in the manner clearly shown in Figs. 8, 9 and 10.

The arms 381 and 391 for carrying the plate 401 and for mounting the yoke 411 to support solenoid 42 are all in substantial accordance with the disclosure in Figs. 1 and 2. The ears 43 and 44 mount the lever 461 in a manner very similar to that already described and the movement of that lever is derived from the bell crank actuating lever 571 and armature 61 in substantially the way already described. However, the bell crank lever 571 is optionally extended at 93 through an opening at 94 in the housing 341 to be available for direct manual release of the brake and to serve the function of an indicator to show when the brake requires adjustment.

In this construction, the floating disk 271 which constitutes the follower has no tubular boss such as that described in connection with the device shown in Figs. 1 to 5. Instead, I provide the follower disk 271 with a short centrally disposed diametrical slot 95 (Fig. 10) with which a flat transverse key 96 at the end of an externally threaded spring housing 97 is engaged. The brake applying spring 77 confined within the spring housing 97 is substantially the same as that already described and it is adjusted in the same manner by means of screw 78 threaded into plate 401. The adjusting nut 701 (Fig. 10) is rotatably threaded externally on the spring housing 97, the latter being prevented from rotating by the engagement of its key 96 in the slot 95 of the non-rotatable follower disk 271 of the brake. In each position of adjustment, the radial grooves 72 of the adjusting nut 701 are fulcrumed upon the fulcrum wedges 48 and 49 of lever 461 in the same manner as in the device originally described. This allows the slight oscillatory movement of the brake releasing lever 461 to occur with perfect freedom respecting the nut 701, which moves rectilinearly with the spring housing 97 to the right as viewed in Fig. 7 to release the brake applying pressure by compressing spring 77.

In all forms of the device, the brake releasing lever 46 compresses the brake applying spring 77, to relieve the brake disks of pressure whenever the solenoid 42 is energized. As above explained, this will ordinarily occur whenever the motor is energized. In all forms of the device, the lever which compresses the spring to relieve the brake pressure is permitted great freedom of movement because of the manner in which the adjusting nut fulcrums upon the wedges 48 and 49 upon the operating lever. These wedges, and the coacting radial grooves in the nut also coact as a detent to hold the nut in any given position of adjustment, the retention thereof being impositive so that the nut is readily operable by a screw driver or like tool to a new position of adjustment.

The device shown in Figs. 1 to 5 has the advantage that upon each readjustment of the nut to restore the bell crank to its original operating position, the brake applying spring will also be restored to its original bias, without requiring separate adjustment. In the device shown in Figs. 7 to 10, the brake applying spring may have to have its bias separately adjusted from time to time, although the operating range of movement is so slight and the wear on the disks is so slight that the device will operate over long periods of time without spring adjustment.

The various indicating means are alternatively usable in the constructions illustrated.

All the constructions shown, and particularly that illustrated in Figs. 7 to 10, result in very substantial reduction in size as compared with previously known brake releasing means. It will, of course, be understood that the number of brake disks used is entirely optional and may be increased or decreased according to requirements.

I claim:

1. In a device of the character described, the combination with a disk brake follower plate and an operating lever therefor, of threaded means connected with the plate and thereby secured against rotation, a nut threaded about said means to provide an exposed annular shoulder, a brake applying spring acting through said means upon the plate, and a brake releasing lever having a portion extending about said means and against which the shoulder of said nut is seated, said threaded means having a socket coaxial with the nut and in which the spring is seated concentric with the nut.

2. The device of claim 1 in which the lever is provided with transverse fulcrum means engaged by the nut.

3. In a device of the character described, the combination with a disk brake follower plate and an operating lever therefor, of threaded means connected with the plate and thereby secured against rotation, a nut threaded about said means to provide an exposed annular shoulder, a brake applying spring acting through said means upon the plate, and a brake releasing lever having a portion extending about said means and against which the shoulder of said nut is seated, said lever being provided with transverse fulcrum means engaged by the nut, the nut having substantially radial grooves adapted in various positions of the nut to receive the fulcrum means to accommodate relative rocking movement between the nut and the fulcrum means and impositively to detain the nut in its selected positions of adjustment.

4. The device of claim 3 in which said spring has a spring seat connected with said nut to act therethrough upon said means for applying pressure to said plate.

5. The device of claim 4 in further combination with a second seat for said spring and a fixed support in which said second seat is adjustable for variation of spring pressure independently of the adjustment between said nut and said plate.

6. The combination with a brake follower plate and a compression spring disposed substantially axially thereof and provided with an adjustably fixed seat, of a seat member providing a second seat for the spring, an adjusting nut concentrically encircling said seat member and connected therewith to provide an exposed annular shoulder, said seat member and nut being in motion transmitting engagement with said plate, and a lever having a fulcrum at one side of said seat member and actuating means at the other side thereof, said lever extending around said seat member and having an opening through which said seat member extends, the lever being provided substantially parallel to its fulcrum with diametrically aligned ribs spaced at opposite sides of said member and bearing against the shoulder of said nut to oscillate respecting the nut in the course of the pivotal movement of the lever while transmitting motion to the nut in a direction to act through said member upon said spring for the compression of the spring and the relief of pressure upon the plate.

7. The combination with a brake follower plate and a compression spring disposed substantially axially thereof and provided with an adjustably fixed seat, of a seat member providing a second seat for the spring, an adjusting nut encircling said member and connected therewith to provide an exposed annular shoulder, said member and nut being in motion transmitting engagement with said plate, and a lever having a fulcrum at one side of said member and actuating means at the other side thereof, said lever extending around said member and having an opening through which said member extends, the lever being provided substantially parallel to its fulcrum with a rib bearing against said nut to oscillate respecting the nut in the course of the pivotal movement of the lever while transmitting motion to the nut in a direction to act through said member upon said spring for the compression of the spring and the relief of pressure upon the plate, the said member being unitarily connected with the nut to rotate therewith, the said plate being provided with an annular boss having external threads upon which the nut is threaded and within which said member is disposed, said member and nut having a flange connection about the end of the boss.

8. The device of claim 7 in which the said member is non-rotatably connected with the plate and has screw threads upon which the nut is rotatably adjustable.

9. The device of claim 7 in which said member comprises a spring housing closed at an end nearest said plate and provided at its opposite end with a radial flange.

10. The device of claim 7 in which the lever has transverse fulcrum wedges and the nut is provided peripherally with notches to receive an adjusting tool and has a face exposed to said lever which is provided with diametrical grooves in which said wedges are engaged for oscillation in the relative movement of said lever and nut and impositively to secure said nut in its adjusted positions.

11. A device of the character described comprising a mounting ring and shaft in combination with brake disks alternately connected respectively with the ring and the shaft, one of said disks comprising a follower plate splined to the ring for axial movement, a compression spring for acting on the follower plate to apply the brake, a spring seat member interposed between the spring and the follower plate, a lever system acting through said member upon said spring in the brake releasing direction and provided with electromagnetic operating means, a housing shell enclosing said lever system and electromagnetic operating means and removably connected with said adapter ring, and a mounting for said lever system and operating means connected with the adapter independently of the housing shell, whereby the housing shell is removable to expose said lever system and operating means while leaving said system and operating means in fully connected operating relationship.

12. The device of claim 11 in which the mounting ring has outwardly opening cavities for mounting bolts and inwardly opening cavities communicating with the interior of the housing shell and adapted to receive wiring for said electromagnetic operating means.

13. The device of claim 11 in which said lever system comprises a first lever disposed transversely of said spring, and a second lever comprising a bell crank having a short arm in thrust engagement with a free end portion of the first lever and a longer arm extending approximately at right angles to the first lever and to which said electromagnetic means is connected.

14. A device of the character described comprising the combination with an adapter ring, a central shaft and brake disks respectively connected with the ring and the shaft, one of said disks comprising a follower plate splined to the ring, of a housing connected to the ring, a mounting plate connected with the adapter ring and provided with an opening substantially on the axis of the shaft, a spring seat member disposed in said opening, a compression spring seated against said member, an abutment carried by said mounting plate opposite the opening thereof, an adjusting screw in said abutment providing a second seat for said spring, a nut connected with said member, means for transmitting the pressure of said spring from said member to said follower plate, and a lever pivoted to the mounting plate at one side of said member and having a free end portion at the opposite side thereof, said lever including an intermediate portion in thrust bearing engagement with said nut to be adjustably positioned respecting said follower plate, said lever acting through said nut upon said member for the compression of said spring to relieve said follower plate from the pressure thereof.

15. The device of claim 14 in which said lever has a central opening through which said member extends and ribs substantially aligned diametrically of the axis of the shaft at opposite sides thereof and engaging said nut to accommodate rocking movement of said lever respecting said nut.

16. The device of claim 15 in which said lever is provided at its free end with an anti-friction bearing, in further combination with a bell crank lever provided with a pivot near said free end of the lever first mentioned, the bell crank lever having a short arm engaging the anti-friction means at the free end of the lever first mentioned, and a long arm extending approximately at right angles to the lever first mentioned and having a remote end provided with means for its actuation.

17. In an automatic brake applicable to a motor or the like, the combination with a disk brake follower plate and externally threaded means connected to the plate, of an adjustable member threaded to said means and provided with an exposed portion for fitted connection with a manipulative tool, said threaded means having an internal socket, a brake applying spring seated in said socket and acting through said threaded means upon the plate, and a brake releasing lever having a portion extending about said means and against which the exposed portion of said adjustable member is seated.

18. In an automatic brake applicable to a motor or the like, said brake comprising engageable friction elements, resilient means biasing said elements toward engagement, electromagnetic means for selectively holding said friction elements out of engagement against the bias of said resilient means, motion transmitting connections between said electromagnetic means and said friction elements, said motion transmitting connections requiring periodic adjustment to compensate for wearing of the friction elements; a housing shell enclosing said electromagnetic means, and a push button and indicator axially reciprocable through said shell and in motion-receiving engagement with said motion transmitting connections, said push button and indicator being adapted to give visual indication of excessive displacement of said connections for showing need of adjustment, and said shell having an annular seal about said push button and indicator, whereby such reciprocation does not expose the interior of said shell to penetration by water or explosive dust or vapor.

ROSWELL H. STEARNS.

REFERENCES CITED

The following references are of record in the file of this patent:

UNITED STATES PATENTS

| Number | Name | Date |
|---|---|---|
| 2,059,244 | Kiekhaefer | Nov. 3, 1936 |